United States Patent
U. et al.

(10) Patent No.: US 12,010,084 B2
(45) Date of Patent: Jun. 11, 2024

(54) SYSTEM AND METHOD FOR MANAGING NOTIFICATION REQUESTS IN A COMMUNICATION NETWORK

(71) Applicant: Telefonaktiebolaget LM Ericsson (publ), Stockholm (SE)

(72) Inventors: Venkatesh U., Chennai (IN); Krishnamoorthy Karthikeyan, Chennai (IN); Anand Varadarajan, Chennai (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 103 days.

(21) Appl. No.: 17/255,941

(22) PCT Filed: Jun. 25, 2018

(86) PCT No.: PCT/IN2018/050413
§ 371 (c)(1),
(2) Date: Dec. 23, 2020

(87) PCT Pub. No.: WO2020/003320
PCT Pub. Date: Jan. 2, 2020

(65) Prior Publication Data
US 2021/0266284 A1    Aug. 26, 2021

(51) Int. Cl.
*G06F 15/16*    (2006.01)
*G06Q 10/10*    (2023.01)
(Continued)

(52) U.S. Cl.
CPC ........... *H04L 51/226* (2022.05); *G06Q 10/10* (2013.01); *H04L 12/1881* (2013.01); *H04W 4/14* (2013.01)

(58) Field of Classification Search
CPC .... H04L 51/226; H04L 12/1881; H04W 4/14; G06Q 10/10
(Continued)

(56) References Cited

U.S. PATENT DOCUMENTS 8,201,205 B2 *   6/2012   Boucher ................. H04L 47/70
                                                          370/254
8,312,096 B2    11/2012   Cohen et al.
(Continued)

OTHER PUBLICATIONS

International Search Report and Written Opinion dated Sep. 6, 2018 in International Application No. PCT/IN2018/050413 (10 pages total).

*Primary Examiner* — Imad Hussain
(74) *Attorney, Agent, or Firm* — Rothwell, Figg, Ernst & Manbeck, P.C.

(57) ABSTRACT

A method for managing notification requests in a communication network is disclosed. The method comprises receiving notification requests from a system of the communication network (110) and, for received notification requests, obtaining an intended outcome of the requested notification (120) and assigning a priority to the received notification request (130). The method further comprises selecting for processing at least one received notification request, wherein the at least one notification request is selected on the basis of a priority assigned to the notification request (160). Assigning a priority to the received notification request comprises estimating a probability that the intended outcome of the requested notification will be achieved, and setting the priority of the received notification request according to the estimated probability (140). Estimating a probability that the intended outcome of the requested notification will be achieved comprises submitting parameters of the received notification request to a model, the (Continued)

model having been trained using parameters of historical requested notifications and their outcomes (150).

21 Claims, 12 Drawing Sheets

(51) Int. Cl.
*H04L 51/226* (2022.01)
*H04L 12/18* (2006.01)
*H04W 4/14* (2009.01)

(58) Field of Classification Search
USPC .......................................................... 709/207
See application file for complete search history.

(56) References Cited

U.S. PATENT DOCUMENTS

| | | | |
|---|---|---|---|
| 9,531,651 B1 * | 12/2016 | Cherubini | H04L 51/214 |
| 9,959,551 B1 * | 5/2018 | Schermerhorn | H04L 67/63 |
| 9,979,680 B2 | 5/2018 | Chen et al. | |
| 2003/0046421 A1 * | 3/2003 | Horvitz | H04L 51/00 |
| | | | 709/206 |
| 2004/0002988 A1 * | 1/2004 | Seshadri | G06F 16/24568 |
| | | | 707/999.102 |
| 2005/0149622 A1 * | 7/2005 | Kirkland | H04L 51/04 |
| | | | 709/207 |
| 2009/0233630 A1 | 9/2009 | Wilson | |
| 2013/0288722 A1 | 10/2013 | Ramanujam et al. | |
| 2015/0019654 A1 * | 1/2015 | Wheeler | H04L 51/224 |
| | | | 709/206 |
| 2017/0339240 A1 | 11/2017 | Muller et al. | |
| 2018/0013844 A1 * | 1/2018 | Foged | H04L 51/52 |
| 2018/0053401 A1 | 2/2018 | Martin et al. | |
| 2018/0145842 A1 | 5/2018 | Golin | |
| 2019/0235936 A1 * | 8/2019 | Murdock | H04W 68/02 |

* cited by examiner

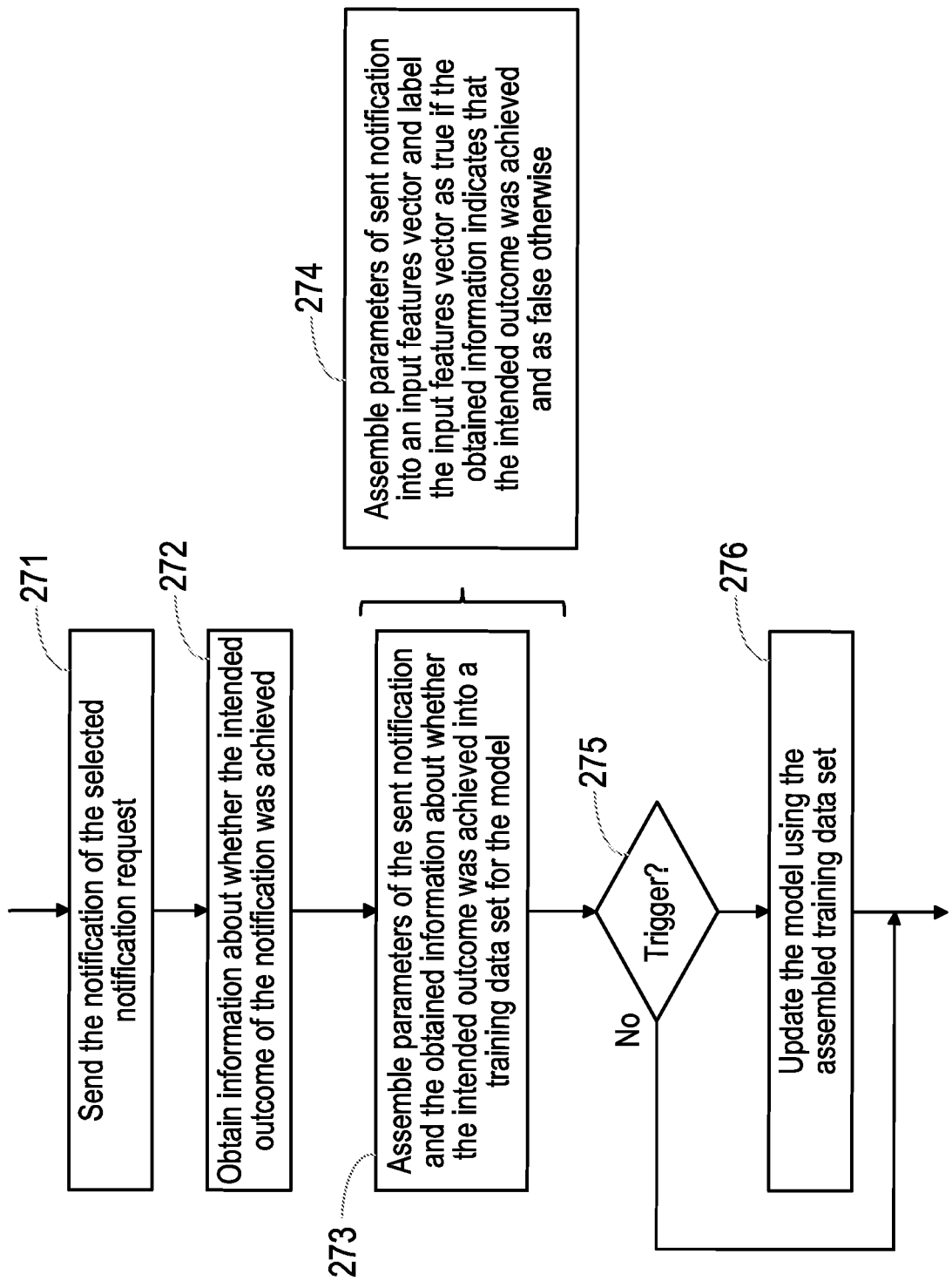

SYSTEM AND METHOD FOR MANAGING NOTIFICATION REQUESTS IN A COMMUNICATION NETWORK

CROSS REFERENCE TO RELATED APPLICATION(S)

This application is a 35 U.S.C. § 371 National Stage of International Patent Application No. PCT/IN2018/050413, filed Jun. 25, 2018, designating the United States.

TECHNICAL FIELD

The present disclosure relates to a method for managing notification requests in a communication network, a notification request comprising a request from a system of the communication network that a notification be sent to a user of the communication network over a delivery channel. The present disclosure also relates to a Notification Management System of a communication network, and to a computer program product configured to carry out a method for managing notification requests in a communication network.

BACKGROUND

Notifications sent by network operators to users of communications networks play an indispensable role in the operation of such networks. From the resolution of technical problems experienced by a user to the day to day management of an account, including data limits, management of additional services etc., a wide range of information is provided to network users via notifications.

Example notifications received by a user may include a welcome notification such as a Short Message Service (SMS) message on joining the network, and one or more activation notifications, enabling a user to activate one or more services on their account. Account and product updates may also be notified to the user via notifications. In the event of an issue with service provision or hardware, the status and progression of issue resolution, together with resolution instructions, may be communicated to the user through notifications. In a further example, the smooth processing of bill payment may be managed through notifications, including for example a notification of bill amount when a bill for a particular billing period is ready, a reminder notification for bill payment when a deadline is approaching and a payment confirmation notification when a bill is paid. The smooth functioning of user notifications thus facilitates the day to day management of a communication network and is an important factor in perceived network performance for users.

FIG. 1 is a block diagram illustrating the module level architecture of a communication network Notification Management (NOTIF) System 2. The NOTIF system 2 provides a framework for sending notifications to a communication network user, also referred to as a subscriber. The NOTIF system 2 may be considered as a router provided with logic enabling it to handle various types of notification requests and configured with several channels 4 for notification delivery. Common notification delivery channels may include Unstructured Supplementary Service Data (USSD), SMS, voice or video calls, email and social media. Communication network systems 6, including for example operational support subsystems such as changing, marketing, issue resolution etc., each generate requests for notifications be sent to particular users. Communication network operators may define within individual systems the particular notification requirements applicable to the system, including for example notification templates and trigger events for the sending of notifications. When an event associated with a defined notification occurs, the relevant system 6 sends a notification request to the NOTIF system 2 including details of the recipient, notification content and the delivery channel to be used.

A Notification Server 8 of the NOTIF system receives message requests for different systems via a message bus 10 and generates appropriate notifications for sending to the relevant user. The notifications may be generated on the basis of the notification requests together with configured user notification preferences, including for example notification channels, languages, notified parties, and notification schedule. The generated notification is then forwarded for delivery to an appropriate gateway corresponding to the selected delivery channel. The Notification Server 8 supports notifications for services including Voice, SMS, Data, LTE, and VoLTE. It may also support notifications including threshold notifications, issue resolution, service activation, refill notifications, promotions, credit limit, and life cycle events.

The illustrated example Notification Server 8 supports rendering and distribution of end user notifications over the following channels:

SMS via SMPP Protocol
Email via SMTP Protocol
USSD via MAP Protocol

The different delivery channels are configured in the NOTIF system 2 and are supported by dedicated subsystems 12. For example the SMS channel is powered a group of SMSCs, an email channel is powered by SMTP servers and so on. When a subsystem supporting a particular channel experiences a failure event, or the channel suffers from performance issues affecting system throughput, the NOTIF system 2 keeps accumulating received notification requests until the channel becomes available again. For example if all the configured SMSCs are not working owing to some network issue, the SMS notification requests will be accumulated until the SMSCs become available again. By the time the affected delivery channel subsystem recovers from a transient failure, owing to the extensive use of notifications across multiple different subsystems, the NOTIF system 2 will have accumulated a significant number of notification requests. In order to avoid flooding notifications and to optimise resources, notification requests usually have an expiry time associated with them, and all notification requests that have expired are dropped by the NOTIF system 2, meaning that the requested notifications are not delivered.

Time based expiry of notification requests can mean that important notifications enabling the resolution of technical problems experienced by the user are not delivered, thus leading to poor perceived network performance. In order to avoid such a situation, sending systems often attempt to track the process of notification requests through status checks sent to the NOTIF system 2. Such status checks are inefficient and increase the load on the NOTIF system.

SUMMARY

It is an aim of the present disclosure to provide a method, system and computer program product which at least partially address one or more of the challenges discussed above.

According to a first aspect of the present disclosure, there is provided a method for managing notification requests in a communication network, a notification request comprising a request from a system of the communication network that a notification be sent to a user of the communication network over a delivery channel. The method comprises receiving notification requests from a system of the communication network and, for received notification requests, obtaining an intended outcome of the requested notification, and assigning a priority to the received notification request. The method further comprises selecting for processing at least one received notification request, wherein the at least one notification request is selected on the basis of a priority assigned to the notification request. According to the present aspect, assigning a priority to the received notification request comprises estimating a probability that the intended outcome of the requested notification will be achieved, and setting the priority of the received notification request according to the estimated probability. According to the present aspect, estimating a probability that the intended outcome of the requested notification will be achieved comprises submitting parameters of the received notification request to a model, the model having been trained using parameters of historical requested notifications and their outcomes.

According to examples of the present disclosure, the method may further comprise processing the selected notification request, for example by assembling the requested notification and forwarding it to an appropriate delivery channel. According to examples of the present disclosure, setting the priority of the received notification request according to the estimated probability may comprise correlating the priority with the estimated probability, such that a higher probability of the intended outcome being achieved leads to a higher priority being assigned to the notification request. According to examples of the present disclosure, the estimated probability may comprise a probability score which may be continuous over a range (for example between 0 and 1). The probability score may in some examples be set as the priority for the received notification request.

According to examples of the present disclosure, the at least one notification request may be selected on the basis of a priority assigned to the notification request if a performance parameter on a delivery channel for notifications falls below a threshold level. According to examples of the present disclosure, the priority based selection of a notification request for processing may thus be conditional upon performance of a delivery channel, as represented by a performance parameter for the delivery channel.

According to examples of the present disclosure, the method may further comprise adding the received notification request to a queue of received notification requests. According to examples of the present disclosure, selecting for processing at least one received notification request, wherein the at least one notification request is selected on the basis of a priority assigned to the notification request, may comprise ordering the queue of received notification requests according to priority assigned to the received notification requests and selecting a notification request at the head of the queue. According to examples of the present disclosure, a threshold level for conditional priority based selection of notification requests for processing may be used to ensure that queue ordering on the basis of priority is carried out if throughput on a delivery channel for notifications is either temporarily interrupted, for example owing to a link failure, or is degraded, for example at a busy period or owing to any other external or network factor.

According to examples of the present disclosure, the method may further comprise ordering the queue according to an entry criterion and determining that a performance parameter on a delivery channel for notifications has fallen below a threshold level. According to examples of the present disclosure, ordering the queue of received notification requests according to priority assigned to the received notification requests may comprise re-ordering the queue of received notification requests according to priority assigned to the received notification requests.

According to examples of the present disclosure, the entry criterion may for example be time of receipt, so that the queue is ordered on a First In First Out (FIFO) basis until the performance parameter falls below the threshold.

According to examples of the present disclosure, the method may further comprise, while performance on the delivery channel remains below the threshold level, receiving a new notification request from a system of the communication network, obtaining an intended outcome of the new requested notification, assigning a priority to the new received notification request, and adding the new received notification request to a position in the queue of received notification requests that is determined according to the assigned priority.

According to examples of the present disclosure, the method may further comprise determining that the performance parameter on the delivery channel for notifications has risen to at least the threshold level, receiving a new notification request from a system of the communication network, obtaining an intended outcome of the new requested notification, assigning a priority to the new received notification request, and adding the new received notification request to a position in the queue of received notification requests that is determined according to an entry criterion.

According to examples of the present disclosure, the method may thus return to a FIFO system for all notification requests received after delivery channel performance is restored, and may do so without re-ordering the existing queue of request notifications that are backed up for processing.

According to examples of the present disclosure, the method may further comprise sending the notification of the selected notification request and obtaining information about whether the intended outcome of the notification was achieved.

According to examples of the present disclosure, the method may further comprise assembling parameters of the sent notification and the obtained information about whether the intended outcome was achieved into a training data set for the model.

According to examples of the present disclosure, assembling parameters of the sent notification and the obtained information about whether the intended outcome was achieved into a training data set for the model may comprise assembling the parameters of the sent notification into an input features vector, and labelling the input features vector as true if the obtained information indicates that the intended outcome was achieved and as false otherwise.

According to examples of the present disclosure, the method may further comprise checking for a training trigger event and on detection of the training trigger event, updating the model using the assembled training data set.

According to examples of the present disclosure, the training trigger event may be expiry of a timer (for example periodic training on a daily, weekly, monthly basis) or some other trigger event. For example, updating of the model may be triggered when a training data set of a threshold size has been assembled.

According to examples of the present disclosure, the method may further comprise comparing the assigned priority of a received notification request to an importance threshold, and, if the assigned priority is at or above the importance threshold, flagging the notification request for guaranteed delivery.

According to examples of the present disclosure, the method may further comprise comparing the assigned priority of a received notification request to an importance threshold and, if the assigned priority is below the importance threshold, discarding the notification request.

According to examples of the present disclosure, there may be multiple importance thresholds, for example including a first importance threshold for determining notification requests to be flagged for guaranteed delivery and a second, lower importance threshold, for identifying notification requests to be discarded. According to examples of the present disclosure, the values of the notification thresholds may be determined by a notification management system at which the method may be performed, or may be obtained from the notification request, and hence set by the system sending the notification request, or may be obtained from a user profile, and so determined from information in the user's subscription conditions, notification options etc.

According to examples of the present disclosure, the method may further comprise obtaining a value for the importance threshold from the notification request.

According to examples of the present disclosure, the method may further comprise obtaining a value for the importance threshold from a user profile of a user identified in the notification request.

According to examples of the present disclosure, the threshold comparison may take place before or after queueing of the notification requests. For example comparison for discard before adding to a queue, comparison for guaranteed delivery before queueing (e.g. going to head of the queue) or only on detection of a performance parameter on the delivery channel falling below a threshold value. Guaranteed delivery notification requests may be placed at the head of a queue which is ordered according to priority or an entry criterion such as FIFO.

According to examples of the present disclosure, the parameters of the received notification request submitted to the model may comprise at least one of user identification, notification identification, notification context and/or user history.

According to examples of the present disclosure, the user history may comprise information on historical user behaviours within the communication network, including voice, messaging and data consumption, and notification context may comprise information about the notification.

According to examples of the present disclosure, the intended outcome of a notification request may comprise a user action carried out after receipt of the notification.

According to examples of the present disclosure, the model may comprise a supervised classification model.

According to examples of the present disclosure, the method may be carried out by a Notification Management System in the communication network.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a Notification Management System of a communication network. The Notification Management System comprises a processor and a memory, the memory containing instructions executable by the processor such that the Notification Management System is operable to receive notification requests from a system of the communication network, and, for received notification requests, obtain an intended outcome of the requested notification, and assign a priority to the received notification request. The Notification Management System further operable to select for processing at least one received notification request, wherein the at least one notification request is selected on the basis of a priority assigned to the notification request. Assigning a priority to the received notification request comprises estimating a probability that the intended outcome of the requested notification will be achieved, and setting the priority of the received notification request according to the estimated probability. Estimating a probability that the intended outcome of the requested notification will be achieved comprises submitting parameters of the received notification request to a model, the model having been trained using parameters of historical requested notifications and their outcomes.

According to examples of the present disclosure, the Notification Management System is further operable to carry out a method according to any one of the preceding aspects or examples of the present disclosure.

According to another aspect of the present disclosure, there is provided a Notification Management System of a communication network. The Notification Management System is adapted to receive notification requests from a system of the communication network, and, for received notification requests, obtain an intended outcome of the requested notification and assign a priority to the received notification request. The Notification Management System is further adapted to select for processing at least one received notification request, wherein the at least one notification request is selected on the basis of a priority assigned to the notification request. Assigning a priority to the received notification request comprises estimating a probability that the intended outcome of the requested notification will be achieved, and setting the priority of the received notification request according to the estimated probability. Estimating a probability that the intended outcome of the requested notification will be achieved comprises submitting parameters of the received notification request to a model, the model having been trained using parameters of historical requested notifications and their outcomes.

According to examples of the present disclosure, the Notification Management System is further operable to carry out a method according to any one of the preceding aspects or examples of the present disclosure.

BRIEF DESCRIPTION OF THE DRAWINGS

For a better understanding of the present disclosure, and to show more clearly how it may be carried into effect, reference will now be made, by way of example, to the following drawings in which:

FIGS. 3a to 3c are flow charts illustrating process steps in another example of method for managing notification requests;

DETAILED DESCRIPTION

Aspects of the present disclosure provide a method and system for managing notification requests in a communication network, according to which at least one received notification request may be selected for processing on the basis of a priority assigned to the notification request. The assigned priority is based on an estimate of a probability that an intended outcome for the requested notification will be achieved. This estimation is generated by submitting parameters of the received notification request to a model, the model having been trained using parameters of historical notifications and their outcomes. Thus according to examples of the present disclosure, notification requests may be processed according to the likelihood that they will achieve their intended outcome, so prioritising for processing those requests which are most likely to achieve their intended outcome.

Communication network notification systems usually deal with a variety of notification sender systems and/or subsystems. The event that triggers a notification, corresponding conditions and priority are configured in the notification sender systems. The Notification Management System (NOTIF) itself generally is agnostic to the conditions that produce a notification.

Notifications which may be requested may generally be divided into those providing information for a user and those intended to prompt a user action. Examples of the two categories of notification are presented below:
  i. Notifications for providing information to users:
    a. Account updates
    b. Regulatory requirements
  ii. Notifications that expect a user action:
    a. Promotions
    b. Payment Reminders
    c. Technical Resolutions (IT)
    d. Authentication of transactions
    e. Account activation
    f. Threshold notification The priority to be associated with a notification for information purposes is generally easily identifiable. For example if there is a regulatory requirement to deliver a notification regarding an account update, this notification must be delivered. The present disclosure is concerned with notifications of the second category, that is notifications that are intended to prompt a user to take some action. As noted above, such notifications may relate to account activation or management, such as threshold notifications, or may relate to resolution of technical issues, the resolution being initiated either by the network operator or by the user. In further examples the notifications may relate to cross selling or upselling of products to a user or to payment reminders.

Figure 1:
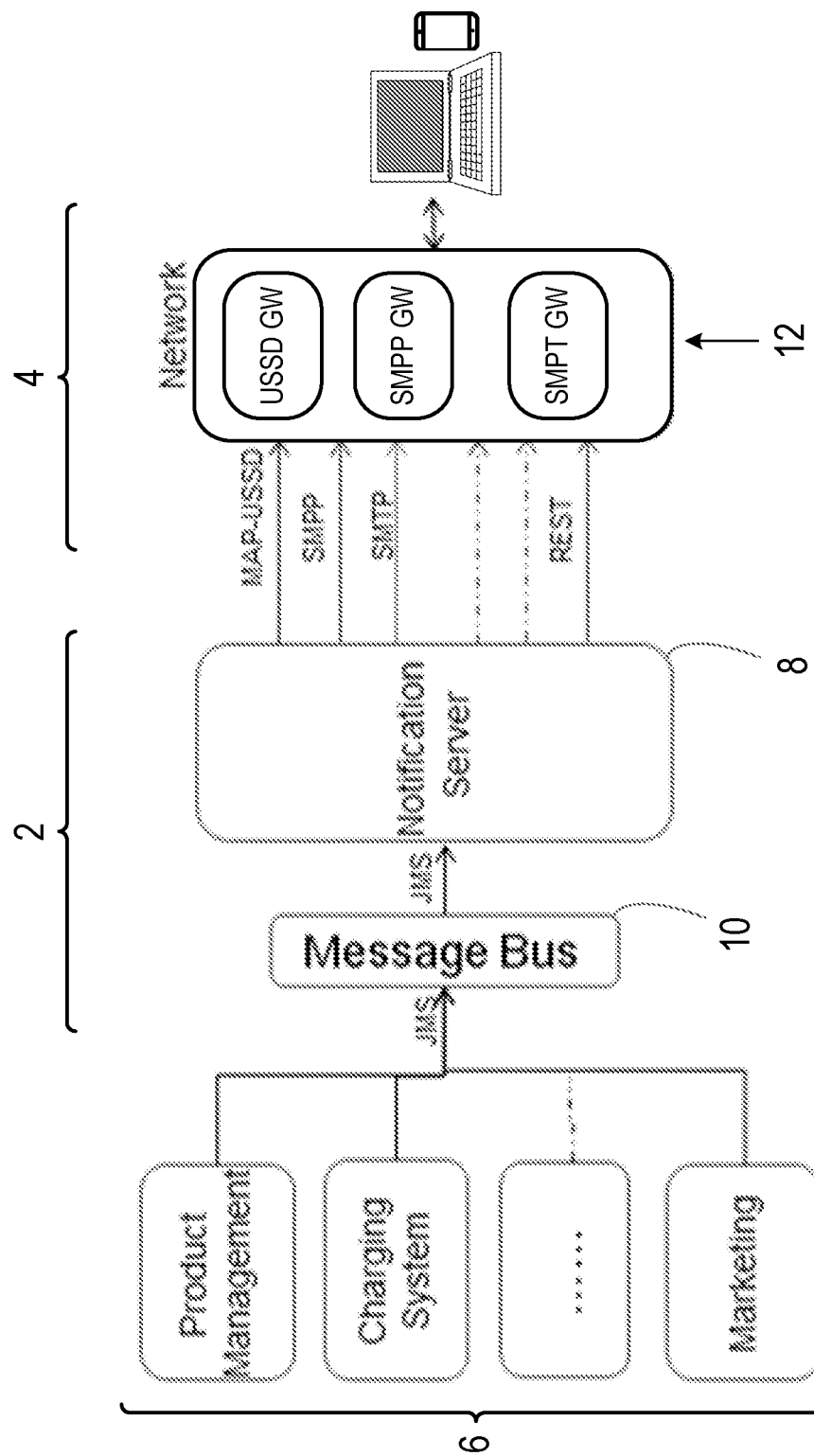
FIG. 1 is a block diagram illustrating an example Notification management System.
Figure 2:
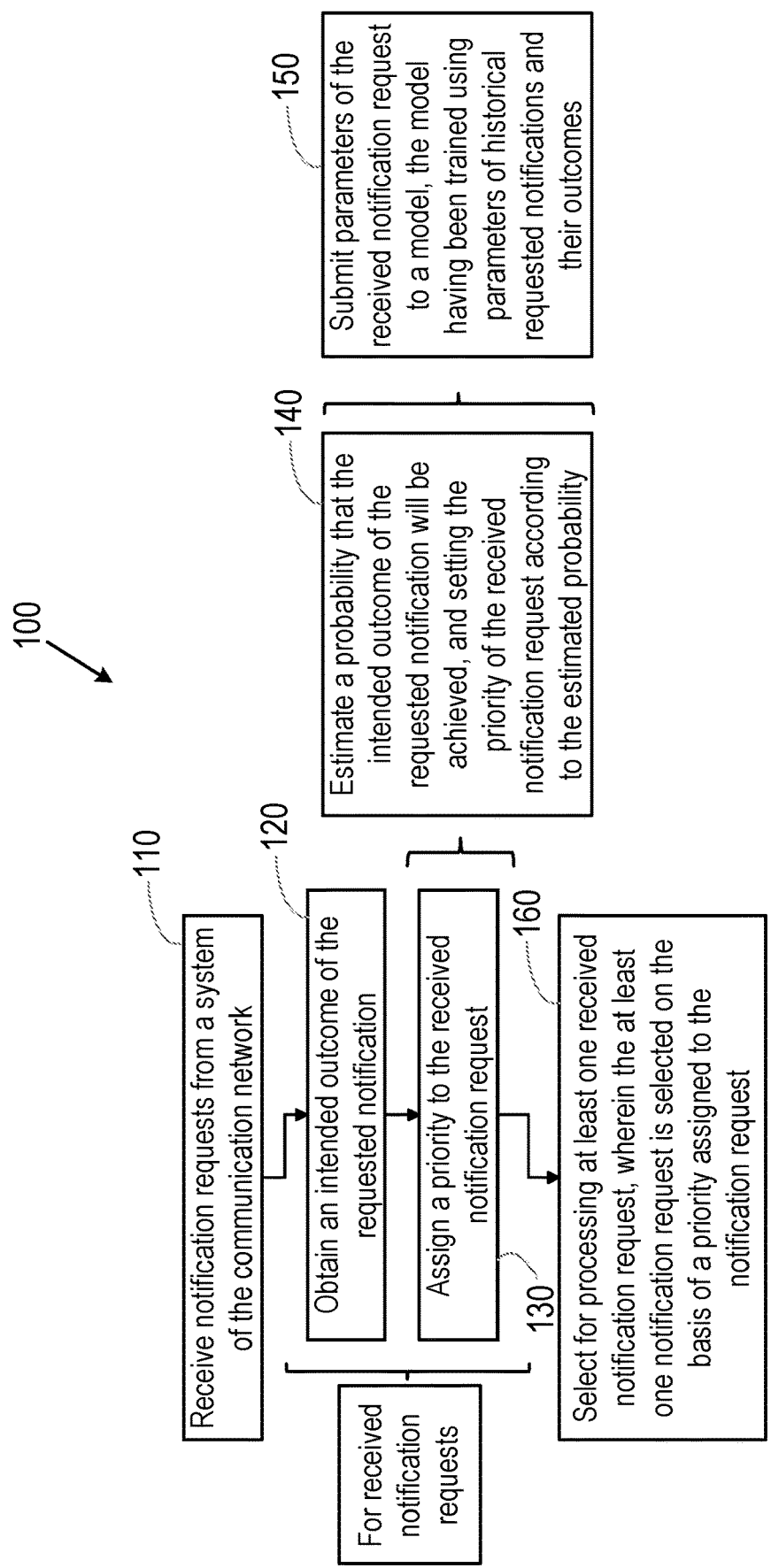
FIG. 2 is a flow chart illustrating process steps in a method for managing notification requests.

FIG. 2 is a flow chart illustrating process steps in a first example of the method 100 for the management of notification requests in a communication network. As discussed above, notification requests are considered to comprise a request from a system of the communication network that a notification be sent to a user of the communication network over a delivery channel. The method may in some examples be carried out by a Notification Management System, as discussed in further detail below.

Referring to FIG. 2, in a first step 110, the method 100 comprises receiving notification requests from a system of the communication network. The system may for example be an operations and management system, charging system, etc. The method then comprises, for received notification requests, obtaining an intended outcome of the requested notification in step 120 and assigning a priority to the received notification request in step 130. As illustrated at step 140, assigning a priority to the received notification request comprises estimating a probability that the intended outcome of the requested notification will be achieved, and setting the priority of the received notification request according to the estimated probability. As illustrated at step 150, estimating a probability that the intended outcome of the requested notification will be achieved comprises submitting parameters of the received notification request to a model, the model having been trained using parameters of historical requested notifications and their outcomes. The method 100 further comprises, in step 160, selecting for processing at least one received notification request, wherein the at least one notification request is selected on the basis of a priority assigned to the notification request.

The model to which parameters are submitted in order to estimate a probability of the intended outcome of a requested notification being achieved may in some examples of the present disclosure be a supervised classification model. This is an example of a machine learning technique that learns to predict an output given an input on the basis of labelled training data.

A notification request is generally configured in a communication network system or subsystem using a system template and additional conditions applicable to the notification to be requested. In addition to the information provided in a notification request, examples of the present disclosure propose to obtain the intended outcome of a notification. This information may be used both in training the model for estimating probability and during an online phase of the model as part of an input vector to permit estimation of a probability for a live notification request. Thus for example when a notification about a resolution of a technical issue is sent to a user, the intended outcome may be that the user restarts their handset to force the handset to disconnect from and reconnect to the network. The intended outcome may be verified by checking with the appropriate core network entities for a request from the user's handset to connect to the network. Additional example notifications and intended outcomes are presented below:

| Notification | Intention |
|---|---|
| Payment of invoice number XXXX is due by mm/dd/yy. | User to pay their bill |
| Your Plan for no XXXX expires on mm/dd/yy. Services will be stopped if not recharged. | Recharge |
| Curious about your Plan Validity? Click http://xxx.xxx.xxx to view your plan details. | Visit the URL |
| To use XXXX service on your phone, please upgrade the mobile operating system to XXXX. | User equipment OS upgrade |
| Please go to settings in your device, select the OPTION A and save to resolve the issue. | Technical Resolution |
| You have signed up for Service XXXX, please message YES to 123 to activate your account. | Account activation |

In some examples, a Notification Management System may maintain a list of intended outcomes for notifications, together with data sources which can be used to verify whether an intended outcome was achieved. Such data sources may include transactional data for a user, user browsing history, user upgrade history, network connection history etc. The list of notifications, intended outcomes and data sources may be exhaustive, including information for all notifications that may be requested of the Notification Management System. The list may be updated as any system or subsystem that interacts with the Notification Management System introduces a new request or makes changes to an existing request or intended request outcome. In some examples, the list may be maintained within the Notification Management System, and the Notification Management System may have access to all relevant data sources to verify whether or not intended outcomes have been achieved. In other examples, the list may be maintained separately, for example in a server or hosted on the Cloud, and the Notification Management System may query a physical or virtual entity to obtain intended outcomes for requested notifications and information on whether intended outcomes for sent notifications were achieved.

Figure 4:
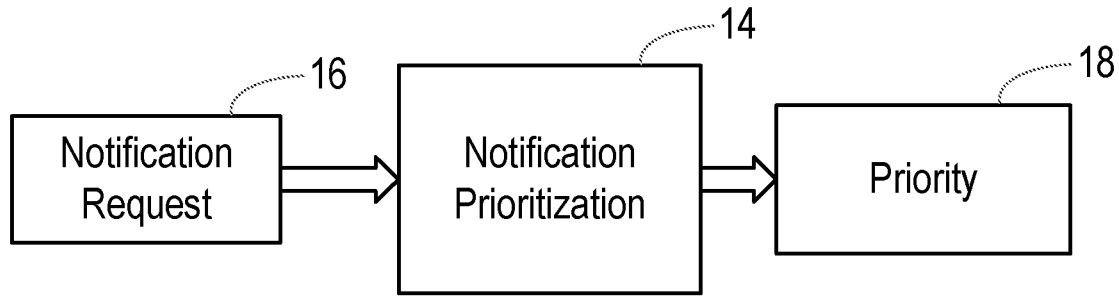
FIG. 4 is a block diagram illustrating a prioritisation system.

As discussed in further detail below, the notification management system may assemble parameters of a sent notification together with information about whether the intended outcome of the sent notification was achieved into a training data set of the model for estimating probabilities for the purpose of assigning priorities to requested notifications. The training data set consists of input feature vectors, each of which may include parameters of a sent notification together with information about the user to which the notification was sent. Example features for an input feature vector may include:
  i. Call Usage
  ii. SMS Usage
  iii. Data Usage
  iv. Spend
  v. Recharge
  vi. Notification Request Content (Text)
  vii. Notification Request Sender
  viii. Notification Request Type Each input feature vector may be labelled to complete the training data. A feature vector may be labelled as true if the intended outcome was achieved and false otherwise. The machine learning model may then be periodically trained using the assembled training data to allow for the estimation of a probability as to whether an intended outcome for a newly requested notification will be achieved. A priority for the newly requested notification may then be assigned based on the estimated probability that the intended outcome will be achieved. In this manner, the task of assigning a priority is represented as a binary supervised classification problem. As illustrated in FIG. 4, the model may be hosted in a notification prioritisation system 14, to which notification requests 16 are input and from which priority values 18 are output.

Figure 3A:
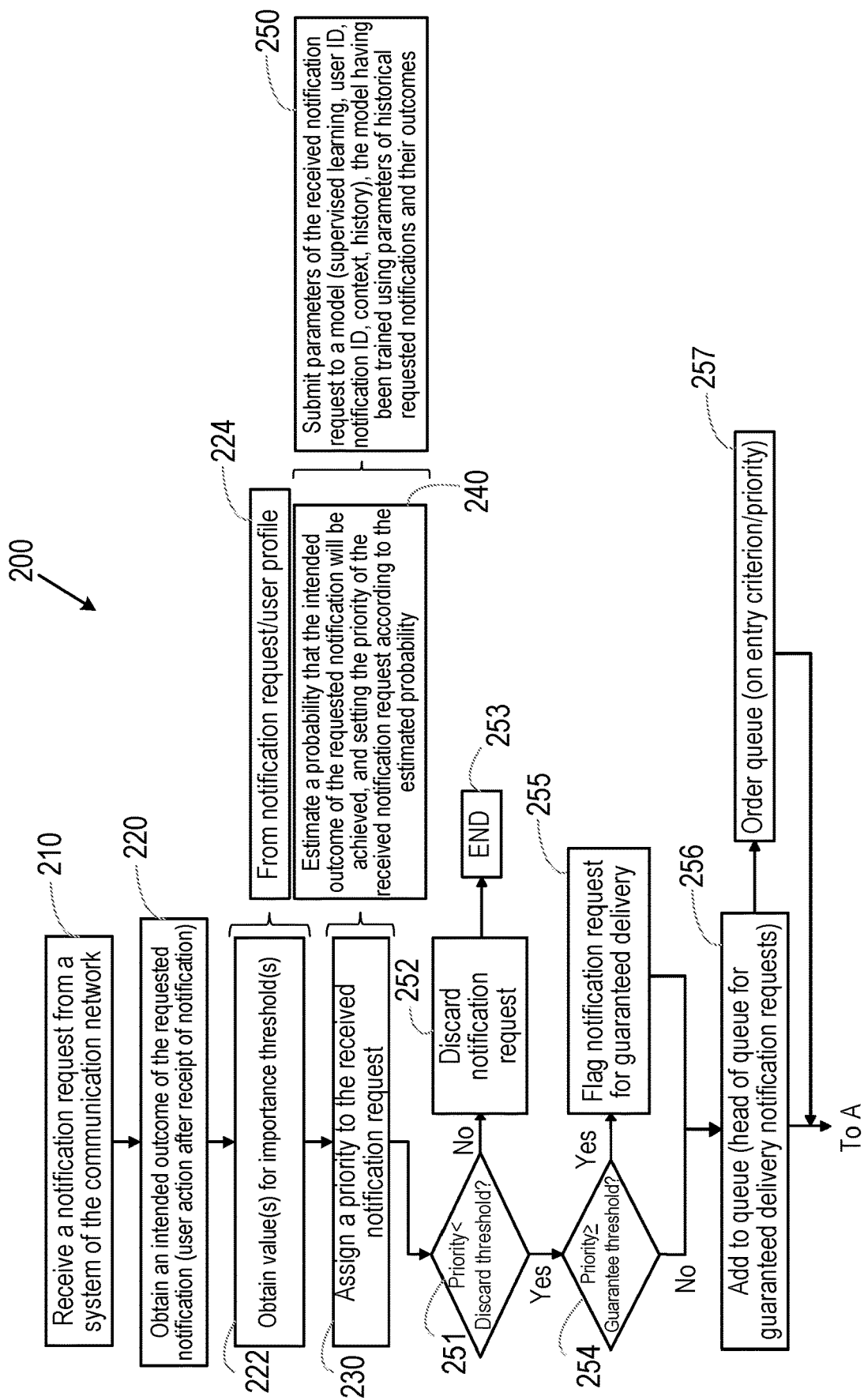
Figure 3B:
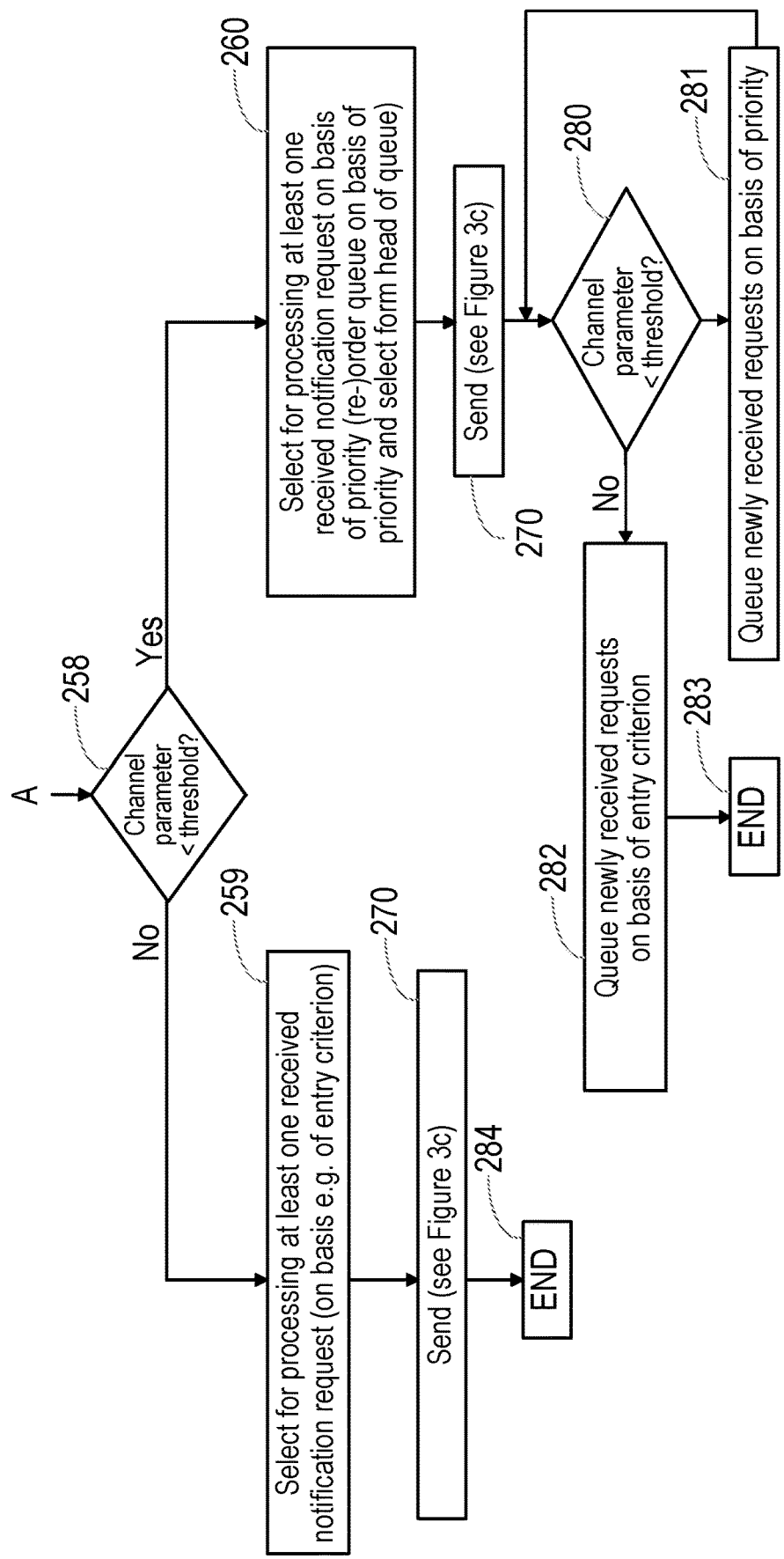

FIGS. 3a to 3c are flow charts illustrating another example of a method 200 for managing notification requests in a communication network. The method 200 provides one example of how the steps in the method 100 may be implemented and supplemented in order to provide the above discussed and additional functionality. As for the method 100, the method 200 may be carried out by a Notification management System, as discussed in further detail below.

Referring to FIG. 3a, in a first step 210, the method comprises receiving a notification request from a system of the communication network. The method then comprises, in step 220, obtaining an intended outcome of the requested notification, which may be an intended user action to be carried out by the user after receipt of the notification. As discussed above, this intended outcome may be obtained by consulting a list maintained within a Notification Management System or by querying another entity. In step 220, the method 300 comprises obtaining one or more values for one or more importance thresholds applicable to the received notification. As illustrated in step 224, these values may be obtained from the notification request itself, that is they may be provided by the requesting system or subsystem, or they may be obtained from the user profile of the user to whom the notification is to be sent, or from another source. The importance thresholds may include a discard threshold and/or a guaranteed delivery threshold, as discussed in further detail below.

In step 230, the method comprises assigning a priority to the received notification request. As illustrated in step 240, this comprises estimating a probability that the intended outcome of the requested notification will be achieved, and setting the priority of the received notification request according to the estimated probability. The priority may be set such that the higher the probability that the intended outcome will be achieved, the higher the priority assigned to the request. In some examples, the estimated probability may be a numerical score within a range, and the assigned priority may be equal to the estimated probability. As illustrated in step 250, estimating a probability may comprise submitting parameters of the received notification request to a model, the model having been trained using parameters of historical requested notifications and their outcomes. As discussed above, the submitted parameters may include user ID, notification ID, notification context, user history etc. and the model may be a supervised learning model.

Having assigned a priority to the received notification request, the method 300 may then comprise checking the priority against one or more importance thresholds. As illustrated in step 251, the method may first comprise comparing the assigned priority of the received notification request to a discard importance threshold in step 251, and discarding the notification request in step 252 if the assigned priority is below the importance threshold. Having discarded the received notification request, the method may then end at step 253, and for example restart at step 210 with receipt of a new notification request. In some examples (not shown), the comparison of priority to a discard threshold may only be carried out under certain circumstances, for example if a delivery channel for the requested notification is experiencing degraded performance. This may be established via a check on a channel performance parameter, such as may be carried out at step 258 discussed below.

In step 254, if the received notification request is not to be discarded, a further check may be made in step 254 comparing the assigned priority of the received notification request to a guaranteed delivery importance threshold. If the assigned priority is at or above the guaranteed delivery importance threshold, the notification request may be flagged for guaranteed delivery in step 255. As for the comparison step 251, the comparison against a guaranteed delivery importance threshold in step 254 may be made conditional upon a delivery channel performance or other factors.

It will be appreciated that the use of importance thresholds may be managed at different systems, depending upon from where the values for the importance thresholds are obtained. Thus if a requesting system or subsystem wishes to ensure that a requested notification will definitely be delivered, it may set a value for the guaranteed delivery threshold that is very low, for example equal to the minimum value that the assigned priority may take, and may include this value in the notification request. In this manner, a requesting system or subsystem may be sure that the assigned priority for the notification request will be at least equal to the guaranteed delivery threshold and that the requested notification will therefor definitely be delivered. The requesting system or subsystem may therefore omit any checking procedures to follow the progress of the notification request at the Notification Management System. In other examples, a user may directly or indirectly set values of importance thresholds for particular requests through management of preferences in a user profile. Thus a user may choose to always or never receive a certain type of notifications. Discard and guaranteed delivery thresholds for certain types of notifications addressed to that user may be set accordingly, to ensure that requests for notifications that a user does not wish to receive are always discarded, and requests for notifications that a user always wishes to receive are always guaranteed for delivery. The freedom of a user to set such priorities may be restricted to comply with regulatory requirements and network priorities etc.

Referring still to FIG. 3a, in step 256, the received notification request may be added to a queue of notification requests. The position in the queue at which the notification request is added may be affected by the presence of a guaranteed delivery flag (for example queueing flagged requests at or near the head of the queue) and may be determined by one or more criteria. The position in the queue may be determined according to one or more entry criteria, such as FIFO, or may be determined according to priority. The method 300 may further comprise ordering the queue according to an entry criterion or priority in step 257. It will be appreciated that according to different implementation scenarios, as discussed in further detail below, the queue may be ordered according to an entry criterion such as FIFO when all delivery channels are operating normally and no other exceptional circumstances apply, and may for example be re-ordered according to priority when performance on one or more delivery channels is degraded, or other exceptional circumstances apply. This is discussed in further detail below.

Referring now to FIG. 3b, a check may be made at step 258 as to whether a performance parameter on a delivery channel for notifications has fallen below a threshold level. Such a fall in performance parameter may be caused by a network failure completely interrupting delivery of notifications over the channel, or by high resource use, high levels of congestion etc. Any suitable channel parameter may be used as the channel performance parameter, or the channel performance parameter may be a combination of channel parameters such as available bandwidth, latency, delay, channel quality etc. This check may be performed for example in implementation scenarios in which priority based selection of notification requests is conditional upon performance degradation on the relevant delivery channel. According to the illustrated example, if the channel parameter is at or above the threshold (No at step 258), the method may comprise selecting for processing at least one received notification request on the basis of an entry criterion at step 259. The notification of the selected notification request is then sent at step 270. Additional steps may be carried out following the sending at step 270, as illustrated in FIG. 3c and discussed in further detail below. The method may then end at step 284, and may restart at step 210 with the receipt of a new notification request.

Referring again to step 258, if the channel parameter is below the threshold (Yes at step 258), the method may comprise selecting for processing at least one received notification request on the basis of assigned priority. If the queue is ordered according to priority then this may comprise selecting the notification requests at the head of the queue. If the queue is ordered according to FIFO or another entry criterion, this may comprise re-ordering the queue according to priority and then selecting the notification request at the head of the queue. The notification of the selected notification request is then sent in step 270. Additional steps may be carried out following the sending at step 270, as illustrated in FIG. 3c and discussed in further detail below.

Following sending of the requested notification, the method then comprises checking at step 280 whether the channel performance parameter is still below the threshold. For as long as performance on the delivery channel remains below the threshold level, newly received notification requests may be queued on the basis of their assigned priority at step 281. Step 281 may thus comprise receiving a new notification request from a system of the communication network, obtaining an intended outcome of the new requested notification, assigning a priority to the new received notification request, and adding the new received notification request to a position in the queue of received notification requests that is determined according to the assigned priority. Once the performance parameter on the delivery channel for notifications has risen to at least the threshold level, newly received requests may be queued on the basis of an entry criterion at step 282. Step 282 may thus comprise receiving a new notification request from a system of the communication network, obtaining an intended outcome of the new requested notification, assigning a priority to the new received notification request, and adding the new received notification request to a position in the queue of received notification requests that is determined according to the an entry criterion. It will be appreciated the queueing of new requests on the basis of an entry criterion may be carried out without first re-ordering the entire queue. Thus backed up notification requests queued according to priority may be maintained in the priority ordered queue, with newly received requests added to the back of the queue for example on a FIFO basis. In this manner, the backed up notification requests will be cleared in order of priority before the FIFO processing of requests received after channel performance was restored. With channel performance restored, the method may then end at step 283 and for example restart at step 210 with receipt of a new notification request.

Referring now to FIG. 3c, the selected notification request, selected at step 259 or 260, is sent to the destination user over the delivery channel specified in the request in step 271. The method 300 then comprises, in step 272, obtaining information about whether the intended outcome of the notification was achieved. As discussed above, a Notification Management System may maintain a list of notifications, intended outcomes and data sources for verifying intended outcomes, and may have access to such data sources to obtain information about whether an intended outcome was achieved directly. In other examples, a notification management system may query a physical or virtual entity to request this information. In step 273, the method comprises assembling parameters of the sent notification and the obtained information about whether the intended outcome was achieved into a training data set of the model. As discussed above, this may comprise assembling the parameters of the sent notification into an input features vector and labelling the input features vector as true if the obtained information indicates that the intended outcome was achieved and as false otherwise in step 274.

In step 275, the method checks for occurrence of a training trigger event. The trigger event may be expiry of a timer, for example to enforce daily, weekly, monthly or some other period of regular training. In other examples training may be triggered when a training data set of a suitable size is assembled, or on any other suitable criterion. If the trigger event has occurred, the method comprises updating the model using the assembled training data set in step 276. If the trigger event has not occurred, or following updating of the model, the method may return to step 284 (if sending takes places after steps 259 and 270) or to step 280 (if sending takes place after step 260 and 270).

It will be appreciated that in some examples, the priority based selection of notification requests for processing discussed above may be applied only to those notification requests specifying delivery over a delivery channel whose performance is degraded. Notification requests specifying other, unaffected delivery channels may be processed according to priority, an entry criterion such as FIFO, or any other criterion.

The flow charts of FIGS. 3a to 3c are presented with a sequential ordering of steps including: receipt and queueing of a new notification request, selection of a notification request for processing, sending of the notification of the selected notification request, assembly of training data and updating a model according to a training trigger. However, it will be appreciated that certain parts of the presented process may operate substantially independently of other parts. Thus for example, the receipt and queueing of requests may continue substantially independently of the selection and sending of requests, and also of the assembly of training data and periodic updating of the model. Thus although the flow charts of FIG. 3 present a sequential ordering of process steps, in practical implementations, some steps may take place in a different order, and certain steps may be repeated before others are carried out etc. In one example, notification requests may continue to be received, assigned a priority and queued while a delivery channel is interrupted, and thus while the notification system is unable to send notifications corresponding to the queued requests.

Figure 5:
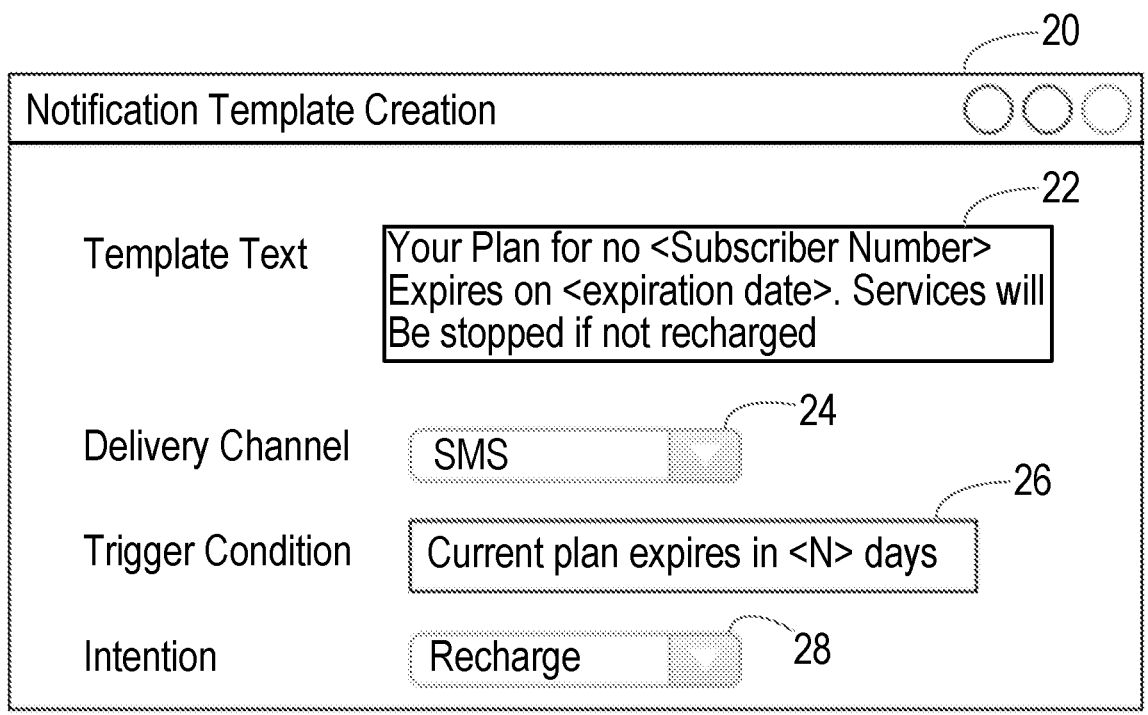
FIG. 5 is a representation of an example notification request template.
Figure 6:
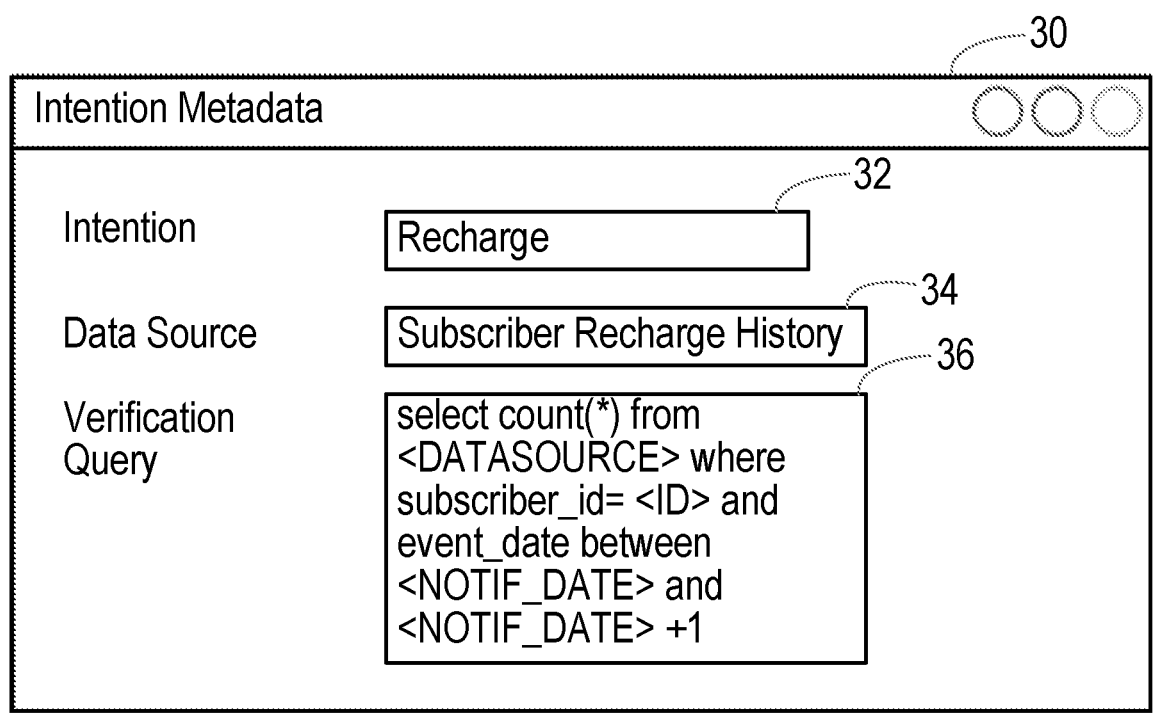
FIG. 6 is a representation of example notification intended outcome information.

An example scenario implementing aspects of the methods 100, 200 is presented below, with reference to FIGS. 5 to 12. A communication network operator may create a notification template 20 as illustrated in FIG. 5 to send a top up reminder for a user N days before expiry of their current plan. The notification template includes template notification text 22, a delivery channel 24 for the notification, a trigger condition 26 for the notification and an intended outcome 28.

Other template notifications may be envisaged, with some example template texts presented below:
Charging Promotion:
 Dear XX, Thanks for using our services, you have now used all your free 1024 MB of data valid till 26 December, therefore the cost for the forthcoming voice and video calls will be charged as per your original rate plan; we wish you a good day.
CHA Threshold:
 Dear XX, Thanks for using our services, you have now used 512 MB of your daily quota. Please check the usage using our Mobile app.
Product Status Change:
 Dear XX, Congratulations! The Promotion Reward Product EPL Video pack has been activated for you with free Video data. It shall be active till 26 Dec. 2017
CHA Refill:
 Dear XX, your top-up for the amount of $20 was successful. Your current balance is $23.04 in voice bucket.
Product Notification:
 Dear XX your product Bronzeline_Voice is due for full repayment by the 26 Dec. 2017. Please ensure that you refill your account in order to repay this before this date.
CHA Auto replenishment:
 Dear XX, You have received $5 valid until 26 Dec. 2017 on your Bronzeline_Voice account. You were charged $5.20.
Interaction:
 Dear XX, This is a notification to inform you that a Family and Friends number has been successfully added. A fee of $2 has been deducted from your billing account.

As discussed above, intended outcomes may be predefined and maintained as a part of a notification prioritisation system, which may be hosted within a Notification Management System. An intended outcome definition may contain details about the metadata that is required to verify if the intended outcome was achieved or not. An example intended outcome definition 30 is presented in FIG. 6 and includes the intended outcome 32, a data source 34 and a verification query 26 to check whether the intended outcome was achieved or not.

Figure 7:
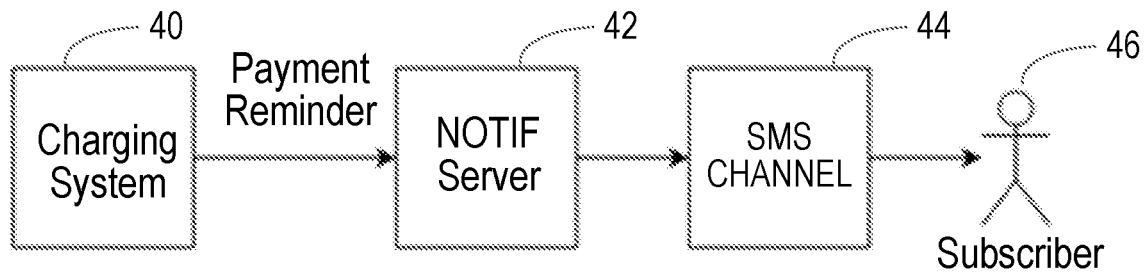
FIG. 7 is a representation of delivery of a notification.
Figure 8:
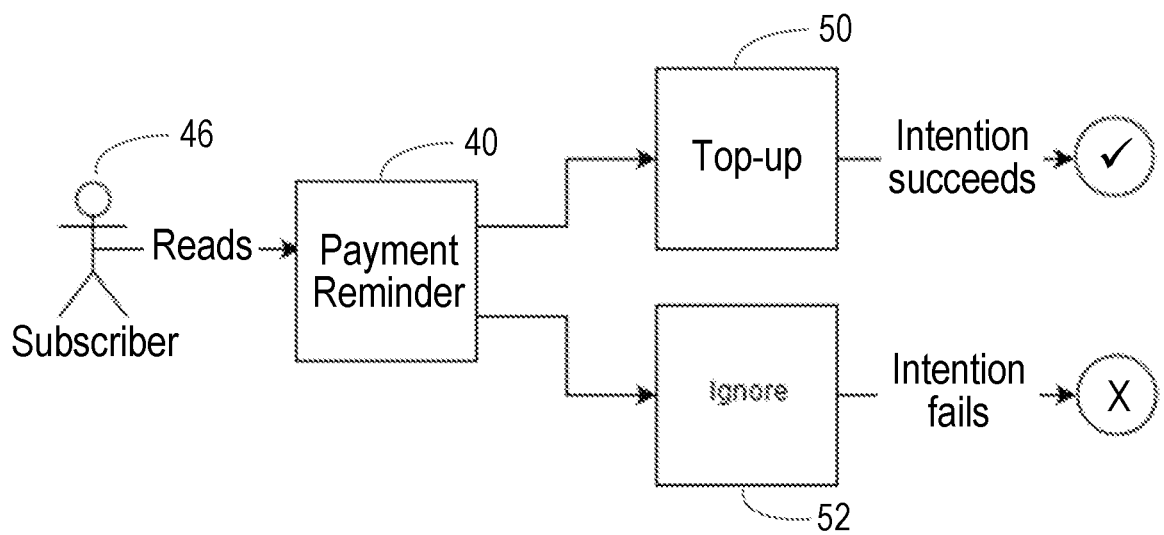
FIG. 8 illustrates possible user behaviour in response to notification receipt.

The delivery process for the example notification request of FIG. 5 is illustrated in FIG. 7, and includes the changing system 40 sending a notification request to a notification management system 42, and the notification management system 42 routing the requested notification through the specified SMS delivery channel 44 such that the payment reminder is delivered to the user 46. FIG. 8 illustrates the possible outcomes of the delivered notification. The user 46 reads the payment reminder 48 and may choose to act upon the reminder, performing top up 50 such that the intended outcome is achieved. Alternatively, the user may chose to ignore 52 the payment reminder, for example if the user has already made a top up or if they do not wish to extend their current plan. In such cases the intended outcome of the notification is not achieved.

Figure 9:
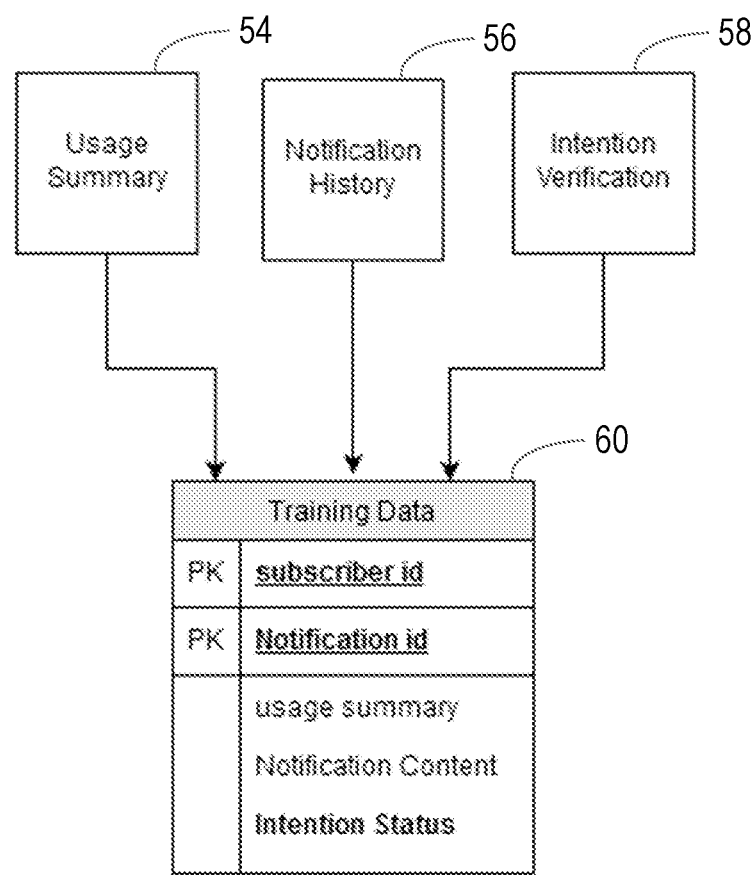
FIG. 9 illustrates assembly of training data.

As illustrated in FIG. 9, the user's usage summary 54 (including calls, sms, data, recharge etc.), notification history 56 and intention verification 58 (success/failure) are combined together on a periodic basic to generate the training data 60 for the model hosted within the prioritisation system.

Figure 10:
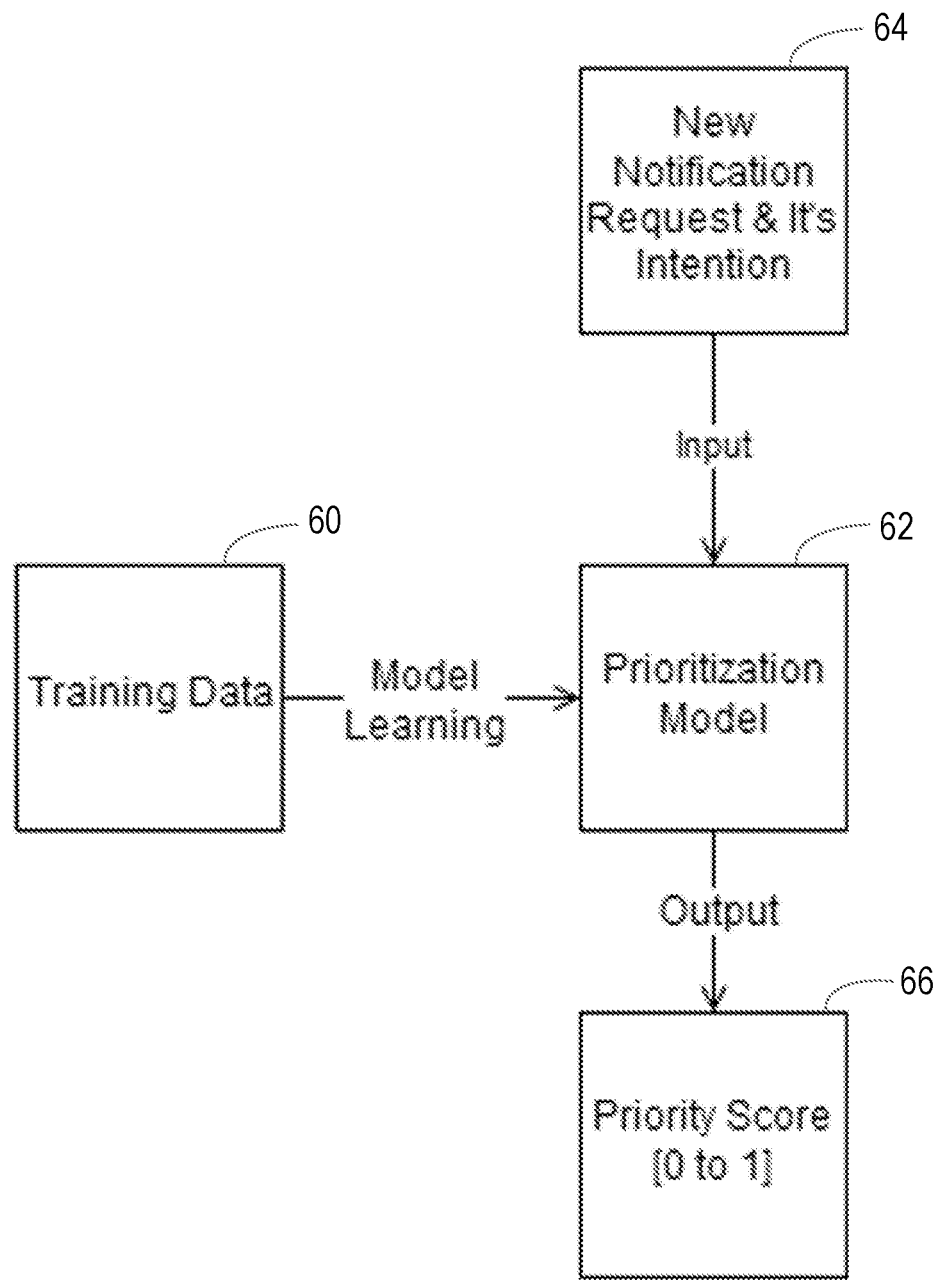
FIG. 10 illustrates assigning priority to a notification request.

As illustrated in FIG. 10, the training data 60 is used to train a machine learning model 62 hosted within the prioritisation system. This model learns the patterns in the provided training data. Based on this learning, for a new notification with intention 64, the model predicts a probability score 66 for the success of the intention. This probability score may be continuous for example in the range [0,1] and may be assigned as the priority of the notification request.

Figure 11:
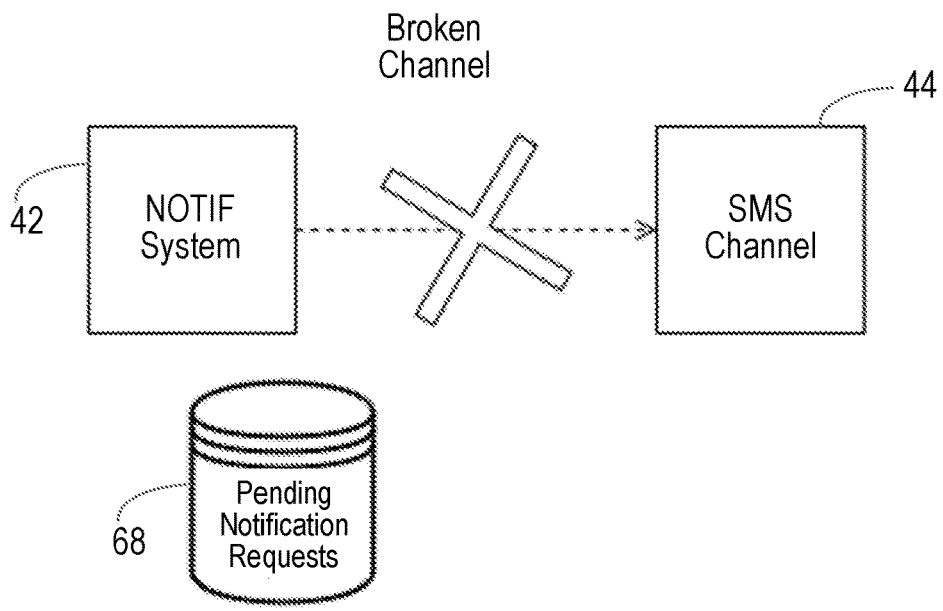
FIG. 11 illustrates a delivery channel failure.

In an implementation involving priority based selection being conditional upon channel performance degradation, a problem occurs in the SMS delivery channel 44 and the throughput of the delivery is affected. In another example, the SMS delivery channel experiences a temporary failure. The problem or channel interruption result in a backlog 68 of requested SMS notifications being accumulated in the NOTIF system 42, as illustrated in FIG. 11.

Figure 12:
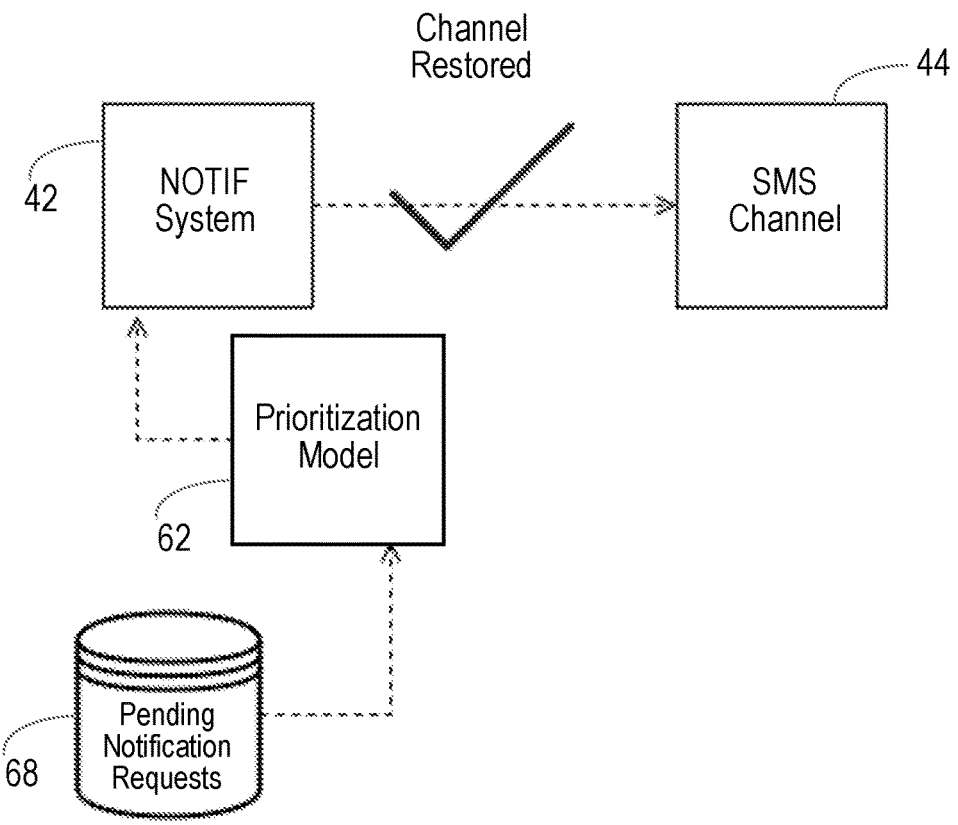
FIG. 12 illustrates delivery channel restoration.

As illustrated in FIG. 12, when the interrupted channel is restored, a large number of notification requests 68 are pending. According to prior art systems, those notification requests that had expired during the channel outage would be discarded without forwarding to the delivery channel. Such discarded requests could for example include a payment reminder for a subscriber who has tendency to pay or recharge only when a notification is sent. If such a notification request is discarded on expiry, this could lead to subscriber not recharging on time, so leading to loss for both subscriber and the operator. Examples of the present disclosure prevent such a situation though the priority based selection of notification requests for treatment, represented in the Figure by the prioritisation model 62. In the example discussed above, the priority assigned to the notification request for the user would be high, owing to the high probability of the intended outcome (payment) being achieved on receipt by the user of the notification. This could lead to the request being flagged for guaranteed delivery, and in any event would lead to the request being selected for processing early, and hence before expiry. If the sending system for the notification request required certainty of delivery, it could set a very low threshold for guaranteed delivery, and so ensure that the notification request would be flagged for guaranteed delivery.

It will be appreciated that the above discussed example scenario is merely one of multiple scenarios that may be envisaged for implementation of methods according to the present disclosure. This and other example scenarios, some of which are alluded to briefly in the description of FIGS. 3a to 3c above, are set out below.

In the example scenario discussed above, a delivery channel experiences a failure, meaning that notifications cannot be delivered. Methods according to the present disclosure may provide a mechanism to preferentially process those notifications that are of the greatest value by prioritisation and re-queueing, ensuring that such notifications are delivered once the channel is restored.

In another example scenario, a delivery channel may be operational but at peak time, owing to congestion, notifications either fail or are delayed. Methods according to the present disclosure may provide a mechanism to preferentially process those notifications that are of the greatest value, such as authentication notifications for a transaction, during the congestion period.

In another example scenario, a delivery channel may be operational but resource usage is high. Methods according to the present disclosure may provide a mechanism to preferentially process those notifications that are of the greatest value, thereby optimising resource usage and potentially avoiding a requirement to provide additional capacity In another example scenario, a delivery channel may be operational with notifications being successfully delivered. Methods according to the present disclosure may provide a mechanism to enhance user experience by ensuring that only those notifications of greatest relevance or importance to a user are delivered. Unwanted notifications may be discarded based on subscription conditions.

It will be appreciated that all of the above scenarios are linked by the association of an intended outcome with a notification, and assigning a priority to a notification request based on the probability of the outcome of the requested notification being achieved, that probability being estimated by a model trained with historical data. The assigned priority is then used in some way to manage how the notification request is processed by a notification management system. Additional implementation scenarios may be envisaged.

Figure 13:
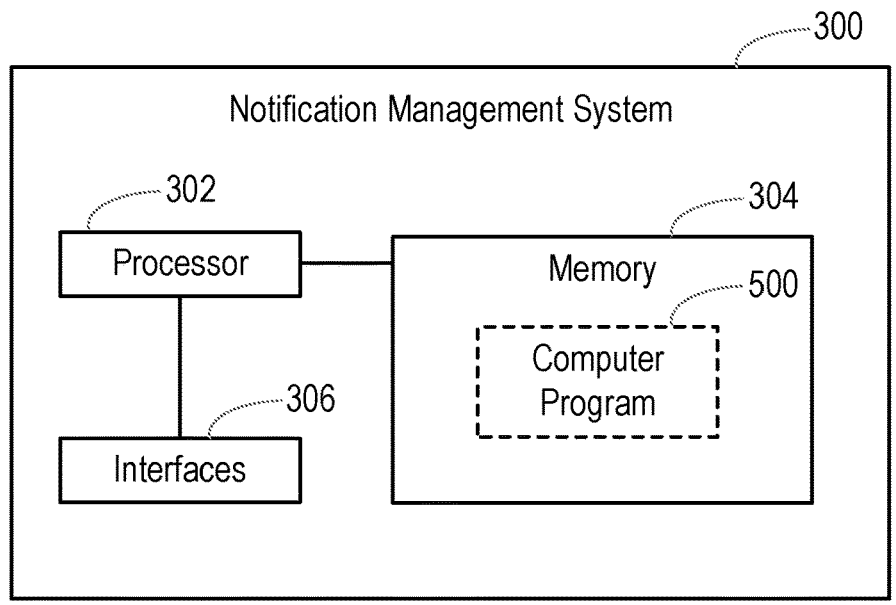
FIG. 13 is a block diagram illustrating functional modules in a Notification management System.

As discussed above, the methods 100, 200 may be carried out by a Notification Management System. FIG. 13 illustrates a first example of Notification Management System 300, which may implement some or all of the steps of method 100 and/or 200, for example on receipt of suitable instructions from a computer program 500. Referring to FIG. 13, the Notification Management System 300 comprises a processor 302, a memory 304 and interfaces 306. The memory 304 contains instructions executable by the processor 302 such that the Notification Management System 300 is operative to conduct some or all of the steps of the method 100 and/or 200. The instructions stored on the memory 304 may in some examples comprise the computer program 500.

Figure 14:
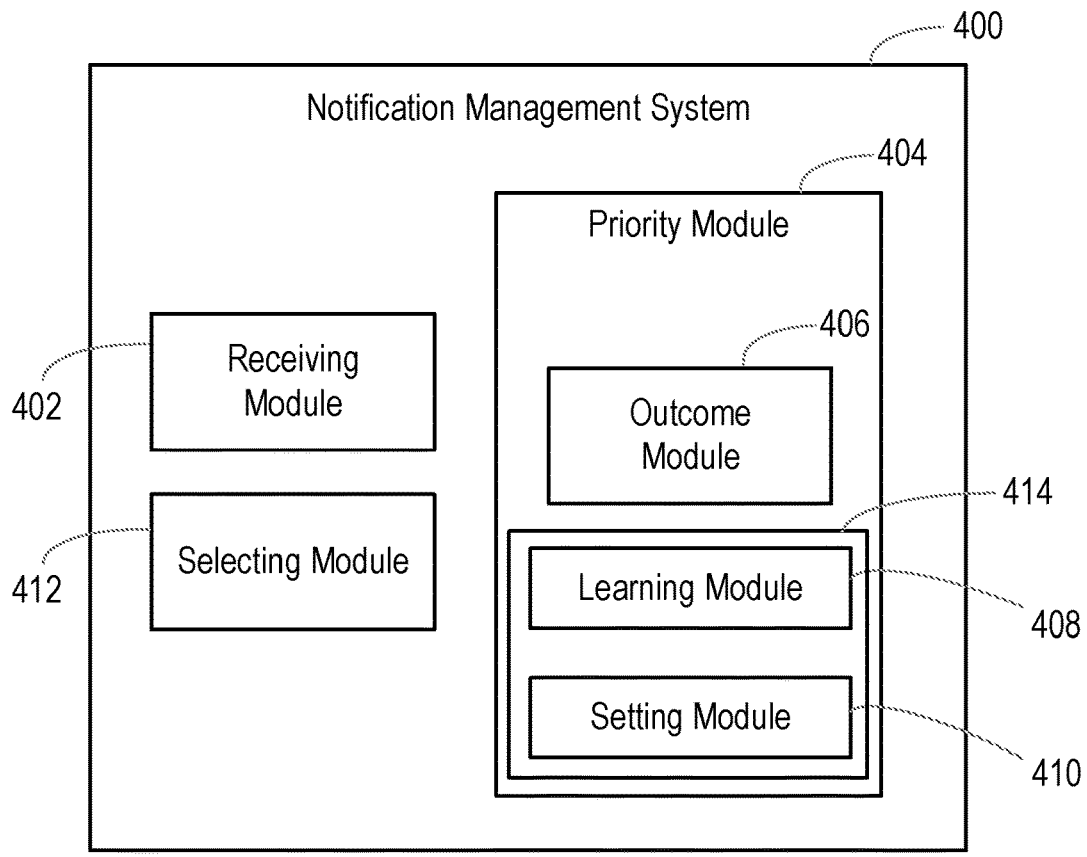
FIG. 14 is a block diagram illustrating functional modules in another example of Notification management System.

FIG. 14 illustrates another example of Notification Management System 400. Referring to FIG. 14, the Notification Management System 400 comprises a plurality of functional modules, which may execute some or all of the steps of method 100 and/or 200 on receipt of suitable instructions for example from a computer program. The functional modules of the Notification Management System 400 may be realised in any appropriate combination of hardware and/or software. The modules may comprise one or more processors and may be integrated to any degree. In one example, the Notification Management System 400 comprises a receiving module 402 for receiving notification requests from a system of the communication network. The Notification Management System 400 further comprises a priority module 404. The priority module 404 comprises an outcome module 406 for obtaining an intended outcome of requested notifications and an assigning module 414 for assigning a priority to the received notification request. The Notification Management System 400 further comprises a selecting module 412 for selecting for processing at least one received notification request, wherein the at least one notification request is selected on the basis of a priority assigned to the notification request. The assigning module 414 comprises a learning module 408 for estimating a probability that the intended outcome of the requested notification will be achieved, and a setting module 410 for setting the priority of the received notification request according to the estimated probability. The learning module is for estimating a probability that the intended outcome of the requested notification will be achieved by submitting parameters of the received notification request to a model, the model having been trained using parameters of historical requested notifications and their outcomes.

It will be appreciated that the components of the Notification Management Systems 300, 400 are logical and may be placed in a distributed fashion on various devices and/or in the Cloud. In other examples, the Notification Management Systems 300, 400 may comprise standalone nodes or apparatuses.

Aspects and examples of the present disclosure thus provide methods for management of notification requests in a communication network, according to which time based expiry and manually configured priorities of a notification request may be supplemented or replaced with a priority that is estimated by a machine learning model. According to examples of the present disclosure, an intended outcome may be associated with a notification and a machine learning model may be trained to estimate, on the basis of notification parameters and intended outcome, the probability of the intended outcome being achieved. The estimated probability may be used to assign a priority to notification requests such that the higher the estimated probability, the higher the importance of the notification request and the higher the assigned priority. The assigned priority may then be used to manage how the notification request is processed by a notification management system. In some examples, priority based selection of requests for processing may be implemented only under certain conditions, such as degraded performance on a delivery channel. The machine learning model for estimating probability may be trained using linked Customer history, Notification history and intention status (achieved/not achieved) without any additional manual labeling effort.

Advantages of methods carried out according to examples of the present disclosure may include ensuring that notification requests of high value that arrive at the notification system during delivery channel failures will still be processed, so reducing potential network problems caused by failure to deliver important notifications.

Examples of the present disclosure may also allow the flexibility of varying priority according to individual user behaviour rather than setting priority at a system or request level, so ensuring that notifications most likely to produce the desired outcome are prioritised. Additionally, the requesting system may be relieved of the need to check the status of a notification request, so reducing load on the notification management system.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for managing notification requests in a communication network, the method comprising:
   receiving a notification request from a system of the communication network, the notification request requesting that a notification be sent to a user;
   determining an intended outcome of the requested notification;
   assigning a priority to the received notification request;
   determining whether a first performance parameter for a first delivery channel for notifications satisfies a first condition, wherein the first performance parameter indicates a characteristic of the first delivery channel; and
   in response to determining that the first performance parameter for the first delivery channel for notifications satisfies the first condition, selecting for processing at least one notification request from a queue comprising a set of notification requests waiting to be processed, wherein the at least one notification request selected for processing is selected on the basis of a priority assigned to the notification request, wherein
   assigning a priority to the received notification request comprises: estimating a probability that the intended outcome of the requested notification will be achieved, and setting the priority of the received notification request according to the estimated probability,
   estimating the probability that the intended outcome of the requested notification will be achieved comprises: submitting parameters of the received notification request to a model, the model having been trained using parameters of historical requested notifications and their outcomes.

2. The method of claim 1, further comprising:
   adding the received notification request to the queue of received notification requests; and
   ordering the queue of received notification requests according to priority assigned to the received notification requests, wherein
   the step of selecting a notification request comprises selecting the notification request that is at the head of the queue.

3. The method of claim 2, further comprising:
   ordering the queue according to an entry criterion, wherein:
   ordering the queue of received notification requests according to priority assigned to the received notification requests comprises, after ordering the queue according to the entry criterion, re-ordering the queue of received notification requests according to priority assigned to the received notification requests.

4. The method of claim 2, further comprising:
   receiving a new notification request, the new notification request requesting a new notification be sent to a user;
   determining an intended outcome of the new notification;
   assigning a priority to the new notification request; and
   adding the new notification request to a position in the queue based on the priority assigned to the new notification request.

5. The method of claim 4, wherein
   the step of adding the new notification request to a position in the queue based on the priority assigned to the new notification request is performed as a result of a determination that the first performance parameter of the first delivery channel satisfies the first condition.

6. The method of claim 1, further comprising:
sending the notification of the selected notification request; and
obtaining information about whether the intended outcome of the notification was achieved.

7. The method of claim 6, further comprising:
assembling parameters of the sent notification and the obtained information about whether the intended outcome was achieved into a training data set for the model.

8. The method of claim 7, wherein assembling parameters of the sent notification and the obtained information about whether the intended outcome was achieved into a training data set for the model comprises:
assembling the parameters of the sent notification into an input features vector; and
labelling the input features vector as true if the obtained information indicates that the intended outcome was achieved and as false otherwise.

9. The method of claim 7, further comprising:
checking for a training trigger event; and
on detection of the training trigger event, updating the model using the assembled training data set.

10. The method of claim 9, further comprising:
comparing the assigned priority of a received notification request to an importance threshold; and
if the assigned priority is below the importance threshold, discarding the notification request.

11. The method of claim 9, wherein the parameters of the received notification request submitted to the model comprise at least one of:
user identification
notification identification
notification context
user history.

12. The method of claim 9, wherein the intended outcome of a notification request comprises a user action carried out after receipt of the notification.

13. The method of claim 9, wherein the model comprises a supervised classification model.

14. The method of claim 9, wherein the method is carried out by a Notification Management System in the communication network.

15. A computer program product comprising a non-transitory computer readable medium storing a computer program comprising instructions which, when executed on at least one processor, cause the at least one processor to carry out the method of claim 1.

16. The method of claim 1, wherein determining whether the first performance parameter for the first delivery channel satisfies the first condition comprises determining whether the first performance parameter has fallen below a threshold level.

17. A method for managing notification requests in a communication network, the method comprising:
receiving a notification request from a system of the communication network, the notification request requesting that a notification be sent to a user;
determining an intended outcome of the requested notification;
assigning a priority to the received notification request;
adding the received notification request to a queue of received notification requests;
ordering the queue of received notification requests according to priority assigned to the received notification requests;
receiving a new notification request, the new notification request requesting a new notification be sent to a user;
determining whether a performance parameter for a delivery channel for notifications satisfies a condition;
as a result of determining that the performance parameter for the delivery channel for notifications satisfies the condition, adding the new notification request to a position in the queue in accordance with an entry criterion;
selecting for processing at least one notification request, wherein the at least one notification request selected for processing is selected on the basis of a priority assigned to the notification request, wherein
the step of selecting a notification request comprises selecting the notification request that is at the head of the queue,
assigning a priority to the received notification request comprises: estimating a probability that the intended outcome of the requested notification will be achieved, and setting the priority of the received notification request according to the estimated probability,
estimating the probability that the intended outcome of the requested notification will be achieved comprises: submitting parameters of the received notification request to a model, the model having been trained using parameters of historical requested notifications and their outcomes.

18. A method for managing notification requests in a communication network, the method comprising:
receiving a notification request from a system of the communication network, the notification request requesting that a notification be sent to a user;
determining an intended outcome of the requested notification;
assigning a priority to the received notification request;
comparing the assigned priority of a received notification request to an importance threshold;
if the assigned priority is at or above the importance threshold, flagging the notification request for guaranteed delivery;
determining whether a first performance parameter for a first delivery channel for notifications satisfies a first condition; and
in response to determining that the first performance parameter for the first delivery channel for notifications satisfies the first condition, selecting for processing at least one notification request, wherein the at least one notification request selected for processing is selected on the basis of a priority assigned to the notification request, wherein
assigning a priority to the received notification request comprises: estimating a probability that the intended outcome of the requested notification will be achieved, and setting the priority of the received notification request according to the estimated probability,
estimating the probability that the intended outcome of the requested notification will be achieved comprises: submitting parameters of the received notification request to a model, the model having been trained using parameters of historical requested notifications and their outcomes.

19. The method of claim 18, further comprising:
obtaining a value for the importance threshold from the notification request.

20. The method of claim 18, further comprising:
obtaining a value for the importance threshold from a user profile of a user identified in the notification request.

21. A Notification Management System of a communication network, the Notification Management System comprising a processor and a memory, the memory containing instructions executable by the processor such that the Notification Management System is operable to:
- determining an intended outcome of a notification requested by a received notification request;
- assigning a priority to the received notification request;
- determining whether a performance parameter for a delivery channel for notifications satisfies a condition, wherein the first performance parameter indicates a characteristic of the first delivery channel; and
- in response to determining that the performance parameter for the delivery channel for notifications satisfies the condition, selecting for processing at least one notification request from a queue comprising a set of notification requests waiting to be processed, wherein the at least one notification request selected for processing is selected on the basis of a priority assigned to the notification request, wherein
- assigning a priority to the received notification request comprises: estimating a probability that the intended outcome of the requested notification will be achieved, and setting the priority of the received notification request according to the estimated probability, and
- estimating the probability that the intended outcome of the requested notification will be achieved comprises: submitting parameters of the received notification request to a model, the model having been trained using parameters of historical requested notifications and their outcomes.

* * * * *